United States Patent
Clapper

(10) Patent No.: US 7,084,765 B2
(45) Date of Patent: Aug. 1, 2006

(54) PROCESSOR-BASED POSITIONING SYSTEM

(75) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 492 days.

(21) Appl. No.: 09/904,236

(22) Filed: Jul. 12, 2001

(65) Prior Publication Data

US 2003/0011477 A1 Jan. 16, 2003

(51) Int. Cl.
*G08B 13/14* (2006.01)

(52) U.S. Cl. .............................. 340/572.1; 340/825.49; 340/539.1; 235/383; 235/384; 705/14

(58) Field of Classification Search ............. 340/573.1, 340/495.1, 572.4, 572.1, 572.6, 568.5, 825.49, 340/539.1; 455/500, 556, 88, 66; 235/375, 235/353, 384; 705/14, 8, 10, 1
See application file for complete search history.

(56) References Cited

U.S. PATENT DOCUMENTS

| | | | | |
|---|---|---|---|---|
| 5,245,534 A | * | 9/1993 | Waterhouse et al. | 364/404 |
| 5,250,789 A | * | 10/1993 | Johnsen | 235/383 |
| 5,406,271 A | * | 4/1995 | Sonnendorfer et al. | 340/825.35 |
| 5,424,524 A | * | 6/1995 | Ruppert et al. | 705/8 |
| 5,572,195 A | * | 11/1996 | Heller et al. | 340/825.35 |
| 5,646,616 A | * | 7/1997 | Komatsu | 340/988 |
| 5,729,697 A | * | 3/1998 | Schkolnick et al. | 395/223 |
| 6,081,536 A | * | 6/2000 | Gorsuch et al. | 370/468 |
| 6,119,935 A | * | 9/2000 | Jelen et al. | 235/383 |
| 6,150,921 A | * | 11/2000 | Werb et al. | 340/10.1 |
| 6,154,139 A | * | 11/2000 | Heller | 340/573.4 |
| 6,211,781 B1 | * | 4/2001 | McDonald | 340/505 |
| 6,351,653 B1 | * | 2/2002 | Alberth et al. | 455/552.1 |
| 6,353,398 B1 | * | 3/2002 | Amin et al. | 340/995.12 |
| 6,456,234 B1 | * | 9/2002 | Johnson | 342/357.09 |
| 6,490,459 B1 | * | 12/2002 | Sugaya et al. | 455/517 |
| 6,533,173 B1 | * | 3/2003 | Benyak | 235/383 |
| 6,587,835 B1 | * | 7/2003 | Treyz et al. | 705/14 |
| 2002/0141442 A1 | * | 10/2002 | Plain et al. | 370/466 |

FOREIGN PATENT DOCUMENTS

JP 2001-306719 A * 4/2000

OTHER PUBLICATIONS

U.S. Appl. No. 09/854,778, entitled, "Establishing A Local Wireless Intranet For Retail Customers," filed May 14, 2001, cover page, pp. 1–18, 3 pages of drawings.
U.S. Appl. No. 09/854,777, entitled "Processor–based Shopping Cart" filed May 14, 2001, cover pages, pp. 1–19, 4 page of drawings.

* cited by examiner

*Primary Examiner*—Benjamin C. Lee
(74) *Attorney, Agent, or Firm*—Trop, Pruner & Hu, P.C.

(57) ABSTRACT

A facility such as a retail facility may include a plurality of wireless identifier tags distributed about the facility. An article associated with a user such as a retail customer may include a detector that detects one or more of those tags when the user is proximate to a tag. For example, a plurality of detectors may be placed on a shopping cart in a retail application. Based on the detection of information associated with each tag, the real time position of the user may be determined in the facility.

27 Claims, 6 Drawing Sheets

PROCESSOR-BASED POSITIONING SYSTEM

BACKGROUND

This invention relates generally to processor-based devices and particularly to portable, wireless processor-based devices.

A local area network enables a plurality of processor-based systems to communicate with one another and with peripheral devices such a printers. A wireless intranet enables communication without the use of cumbersome cable connections.

In general, interaction between customers and between customers and sales personnel in large "bricks and mortar" retail facilities may be relatively limited. Because of the large number of customers, it is not possible in many cases for sales personnel to interact individually with each customer. At best, customers may be advised through a loudspeaker system of special opportunities and other information.

In many cases, greater interactivity may be possible between customers and retail service or product providers in an on-line environment. Customer e-mails may facilitate communication. On-line catalogs may facilitate the provision of information to customers.

Thus, there is a need to enable greater interactivity between customers in retail facilities and the retail facility owner or operator. In many cases, it may be easier for a customer in a retail facility to get help by using a wireless device to access information over the Internet than it is to actually get the information on site.

Thus, there is a need for better ways for improving interactivity between customers and "bricks and mortar" retail facilities.

DETAILED DESCRIPTION

Figure 1:
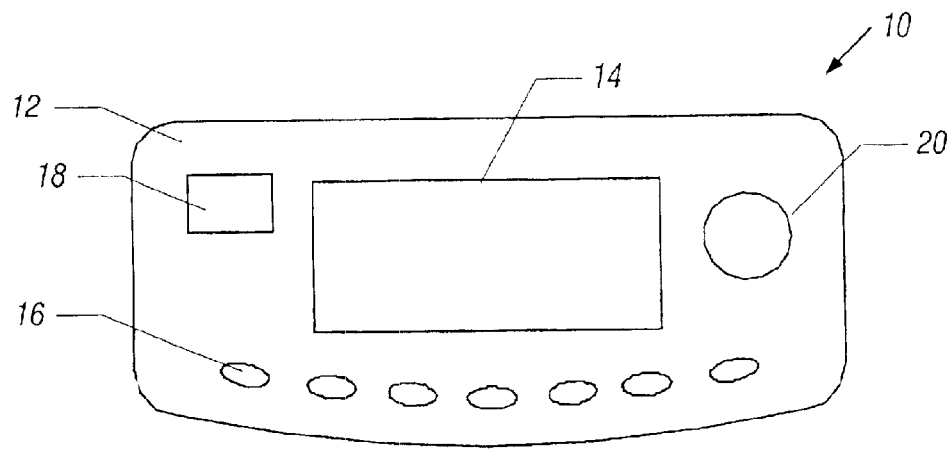
FIG. 1 is a front elevational view of a personal digital assistant in accordance with one embodiment of the present invention.

Referring to FIG. 1, a personal digital assistant or PDA 10, for use by retail customers, may include a housing 12 with a display 14. As used herein, the term PDA refers to any portable, processor-based system. A plurality of user programmable or preprogrammed operators 16 may be provided. A user programmable operator 16 enables automatic implementation of specific functions such as Internet access, audio communications or any of a variety of other functions.

Also included on the housing 12 is a bar code scanner 18 and an audio transducer 20 in one embodiment. The bar code scanner 18 may be utilized to scan products in a retail facility in order to identify a particular product. Once identified, information may be obtained about the product such as its price and availability. The audio transducer 20 facilitates voice and sound communications through the PDA 10 in a fashion described in more detail later.

The PDA 10 may be battery powered, portable or handheld, and may include a wireless transceiver to enable wireless communications with a local area network or intranet. In one embodiment, an internal antenna (not shown) allows wireless communication with a proximate server. For example, an IEEE 802.11 standard protocol wireless local area network may be implemented that includes the PDA 10. See Institute of Electrical and Electronics Engineers (IEEE), New York N.Y., 802.11 (1997).

Figure 2:
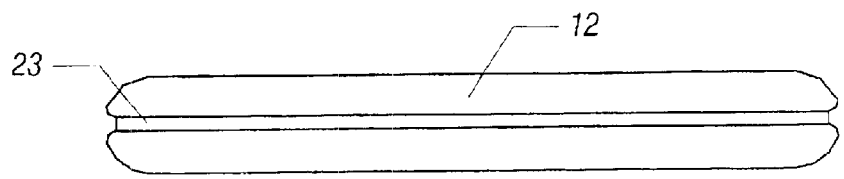
FIG. 2 is a bottom plan view of the personal digital assistant shown in FIG. 1.

Turning next to FIG. 2, one edge of the housing 12 may include a card reader slot 23. The card reader slot 23 receives a smart card or credit card to be scanned. In one embodiment of the present invention, the user may be recognized when the user scans a credit card or other identifying card, including a magnetic stripe, through the card reader slot 23.

In one embodiment of the present invention, the user may own the PDA 10 and may bring the PDA 10 to a retail facility such as a department store, a discount store, a hardware store, or a supermarket. In such case, the card reader 22 may be unnecessary.

In another embodiment of the present invention, the PDA 10 may be made available to customers who arrive at such a retail facility. A customer may be identified by swiping the customer's identification card through the card reader 22. The PDA 10 may then immediately initialize the system for that user, identifying the user's name from the magnetically stored information on the card and correlating the user's identity to a database for each registered user. This database may include information specifically provided by the user to the database (such as the information from the swiped card) as well as information about the habits and practices of a particular user of a PDA 10 gleaned from use of a PDA 10, in some embodiments.

Figure 3:
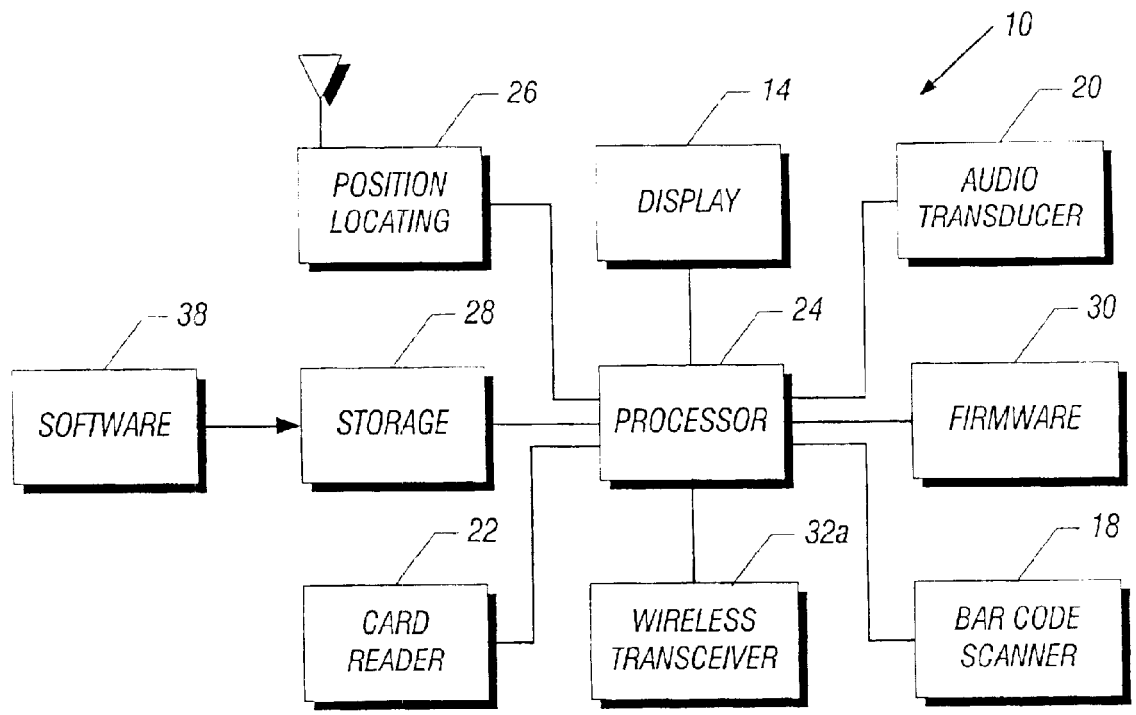
FIG. 3 is a block depiction of one embodiment of the personal digital assistant shown in FIG. 1.

One embodiment to the PDA 10, shown in FIG. 3, includes a processor 24. The processor 24 communicates with the display 14, the audio transducer 20, a card reader 22 and the bar code scanner 18. In addition, firmware 30, including an operating system and a basic input/output system (BIOS), may be provided for controlling the operation of the PDA 10.

The processor 24 may communicate with a wireless transceiver 32a. The wireless transceiver 32a enables wireless communications between the PDA 10 and a proximate local area network. The local area network, not shown in FIG. 3, may include a server that likewise includes a wireless transceiver like the transceiver 32a, in one embodiment.

The processor 24 may also include a storage 28, such as a flash memory, as one example. The storage 28 may store application software 38 for implementing certain functions of the PDA 10.

Finally, the processor 24 may be coupled to a position locating device 26. The position locating device 26 may use radio frequency triangulation techniques or global positioning system techniques, as two examples, to locate the position of the PDA 10 within a retail facility. Thus, the PDA 10 may be part of a network that knows, at any given time, where the PDA 10 is located. The position locating device 26 may indicate where the PDA 10 is located, the processor 24 may receive this information through the wireless transceivers 32, and the processor 24 may cause this information to be broadcast to other devices in a fashion to be described hereinafter.

Figure 4:
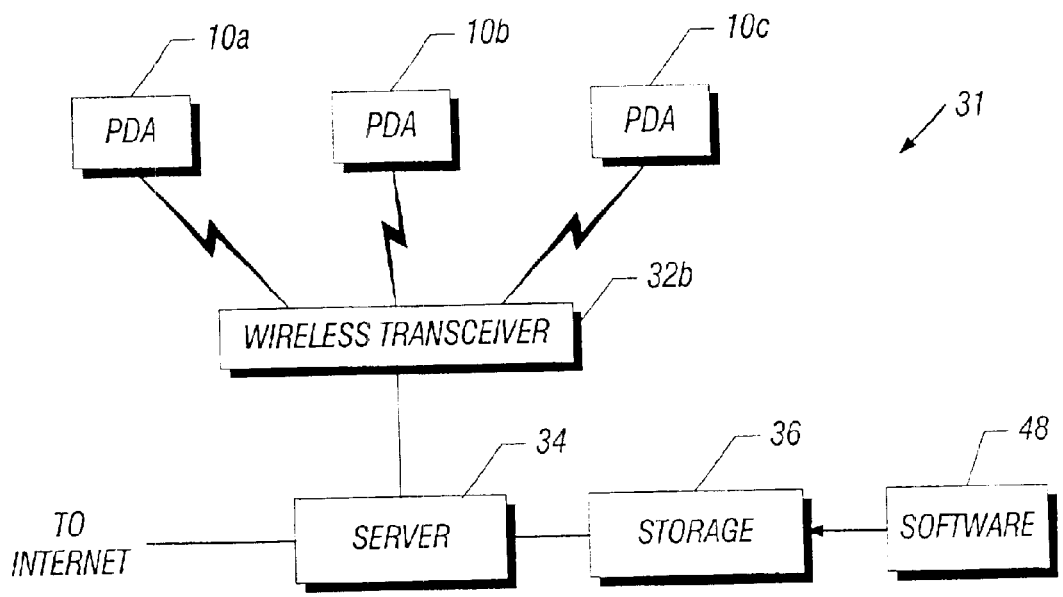
FIG. 4 is a block depiction of a wireless intranet in accordance with one embodiment of the present invention.

Turning now to FIG. 4, a wireless intranet 31 may include a plurality of PDAs 10a, 10b, and 10c. Each of these PDAs 10 may be carried by a different customer in a retail facility. Those PDAs may communicate with a server 34 as a local area network through a wireless transceiver 32b. The wireless transceiver 32b receives wireless communications from each PDA 10 and provides the corresponding information to a server 34.

In this way, a retail facility may implement a wireless intranet wherein communications between various users of PDAs 10 may be forwarded by the server 34 among the various customers. In addition, any customer using a PDA 10 may make queries to the server 34. These queries may seek additional information about products, product locations, store hours, and other useful information to retail customers.

In some cases, broadcasts may be sent or pushed by the server 34 to users of PDAs 10. These broadcasts may be personalized to particular users 10 based on information from a database maintained for each user. Such databases may include information about the user including frequency of store visits, purchase amounts, types of products purchased, interests, and any other information of interest.

The server 34 may include a connection to the Internet to enable the server 34 to access information over the Internet and to provide that information to a PDA 10 making a request for information. Alternatively, the server 34 may itself push Internet information to the PDAs 10. The server 34 is a processor-based system that includes a storage 36 that stores the software 48. The software 48 is an application program that implements the wireless retail intranet.

Any given customer with access to a PDA 10 may wirelessly communicate with other PDA 10 users. These communications may be in the form of electronic mail or may be via audio or voice communications. With voice communications, the voice inputs to the audio transducer 20 may be converted into digital files and sent through the transceiver 32a to the transceiver 32b. The server 34 may then route the communications to an appropriate receiver. Each of a plurality of customers in the store may then be addressed (for example by name or other identifier) by any user who knows other customers who are present within the retail facility.

The PDA 10 may facilitate scanning prices, locating products on a store map relative to the user's present position (which may also be indicated on the map), receiving dynamic directions, locating the position of friends who are also carrying PDAs 10, obtaining product information, keeping track of the running totals of purchases, and even taking advantage of virtual or instant coupons, to mention a few examples.

In one embodiment of the present invention, each PDA 10 may be authenticated using an integral identification such as a silicon serial number that may be stored, for example, in the firmware 30. The PDA 10 is then authenticated for local use within the intranet 31. Temporary aliasing may be provided to connect a PDA 10 to a user's remote e-mail.

In addition, the owner or operator of a retail facility may serve information to the users of the PDA 10. This may include both textual and audio information. Thus, audio or textual information about special sales, features or services may be broadcast to a variety of PDA 10 users. In addition, audio messages may be likewise forwarded through the intranet 31 and the audio transducers 20.

Figure 5:
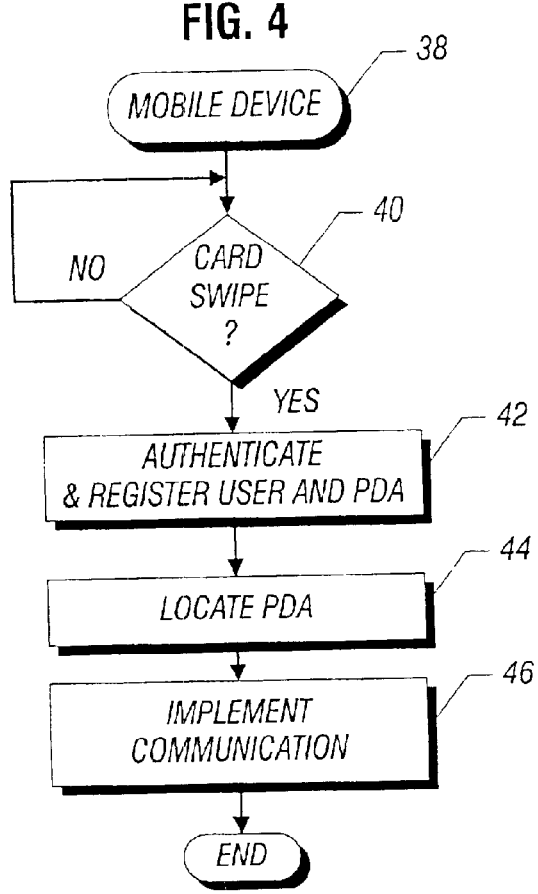
FIG. 5 is a flow chart for software that may be utilized by the personal digital assistant shown in FIG. 1 in accordance with one embodiment of the present invention.

The software 38, stored on the storage 28 of the PDA 10 begins by detecting a card swipe as indicated in diamond 40 in FIG. 5 in accordance with one embodiment of the present invention. A user may be provided a PDA 10 when the user enters the retail facility. The user may authenticate and initiate the PDA 10 by a card swipe through the card reader 22. This immediately provides information about the user's identity without the need to use keys to enter text.

A local or remote database accessed by the server 34 may then provide data to authenticate and register the user and the user's PDA, as indicated in block 42. The database may contain information about the user including the user's name, password, and other codes. In addition, the database may include information about the user's interests, practices and past activities at the retail facility.

The position of the PDA 10 may then be automatically determined by polling the locating device 26. This information may be provided to the server 34 to locate the PDA as indicated in block 44. In one embodiment, a digital map may be displayed on the display 14, showing the layout of a particular retail store. The current position of the user, determined by the locating device 26, may then be displayed as an indication on the display 14.

In some embodiments, other personnel such as the user's friends or the store manager may likewise be identified at a position shown on the display 14. Other indications may be provided dynamically as well including the location of available check out cashiers and the location of sales personnel.

Once a PDA 10 has been authenticated on the intranet 31, located and registered, in some embodiments, communications may be immediately implemented. Both audible and text messages, for example using instant messaging, may be exchanged between various customers holding PDAs 10. In addition, customers may communicate with the retail facility, and particularly the server 34, to obtain additional information, such as product information. The retail facility may provide information to the users in response to user inquiries or as initiated by the retail facility owner or operator. This information may include information about special sales, or store hours as examples. Also music or video may be forwarded to interested customers.

Figure 6:
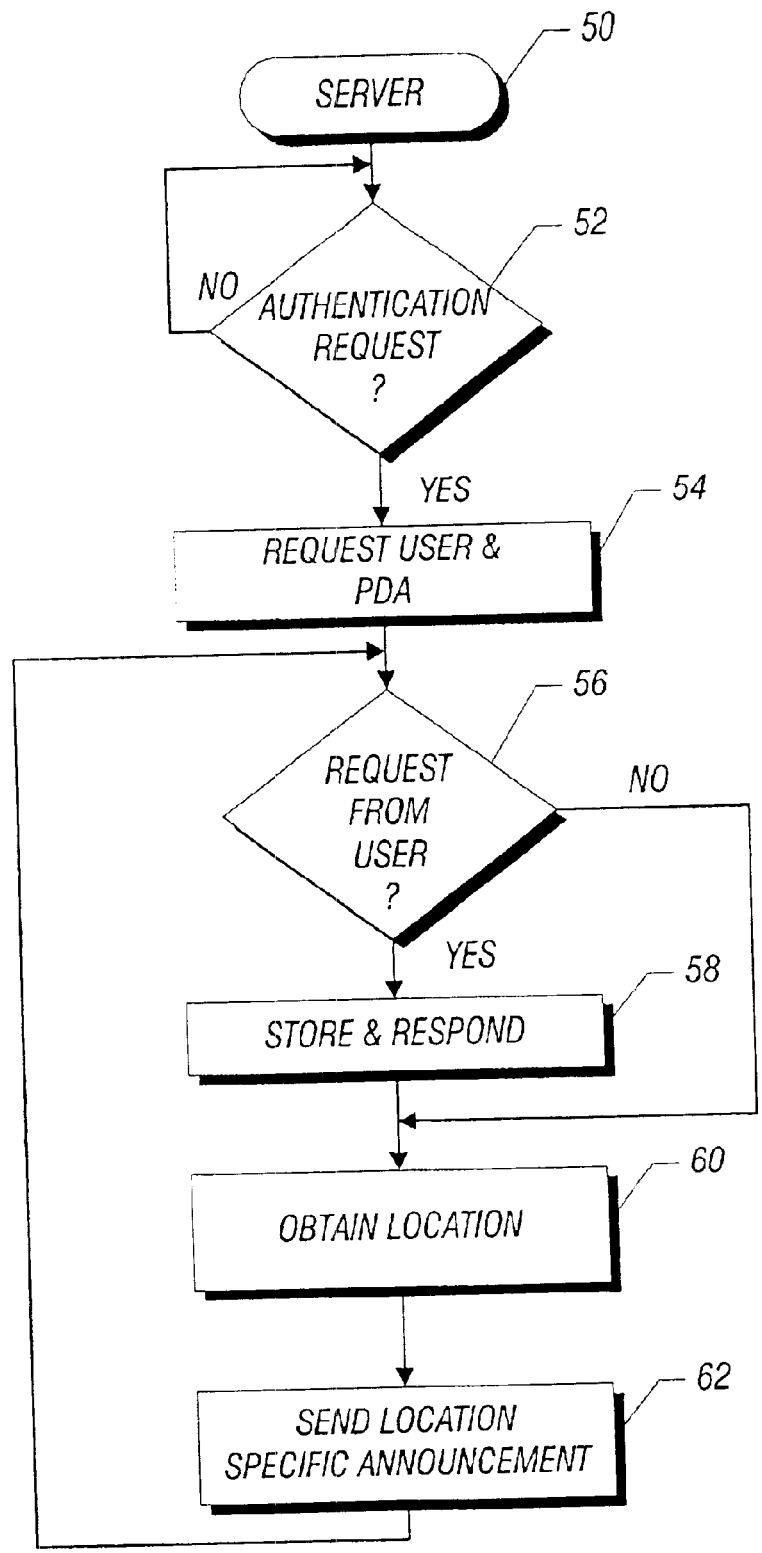
FIG. 6 is a flow chart for software that may be utilized by the server in the wireless intranet shown in FIG. 4 in accordance with one embodiment of the present invention.

Referring next to FIG. 6, the server software 50, stored on the storage 36, may control the operation of the server 34 in accordance with one embodiment. The server software 50 receives an authentication request as indicated at diamond 52 from a PDA 10. In the response to such a request, the user's identity is compared to a database of preregistered users. The information from the user's card swipe may be utilized to identify the user and determine that the user is an authorized and registered user. Once the user has been recognized, as indicated in block 54, the user may be added to a database of active users. Users may allow their presence to be indicated to their friends who may also be located in the store. In such case, the server 34 may register the user and may provide links between a particular user and other users as preauthorized.

When the server 34 receives a user request, as determined in diamond 56, the information may be stored in a database associated with that user in order to obtain information about the user. The request may be responded to, as indicated in block 58, by providing information from the storage 34 or from the intranet, as desired.

If no request is forthcoming within a certain amount of time, the user's location may be obtained as indicated in block 60. This information may be obtained by providing a request to the PDA 10 and particularly its position locating device 26 for its current location. The server 34 then keeps track of the user's location so that the user may be identified on a digital display.

Based on the user's position, the user may receive personalized messages. For example, when the user is close to the plumbing department, the server 34 may provide advertising information relating to particular plumbing products. Thus, as indicated in block 62, location specific announcements may be provided to users either in response to user inquiries or as initiated by the server 34 itself.

Thus, in some embodiments, the PDA 10 may implement any function currently offered by processor-based devices. For example, the user may access, over the Internet, his or her own e-mail account or may access the Internet using a predefined Internet service provider account.

Figure 7:
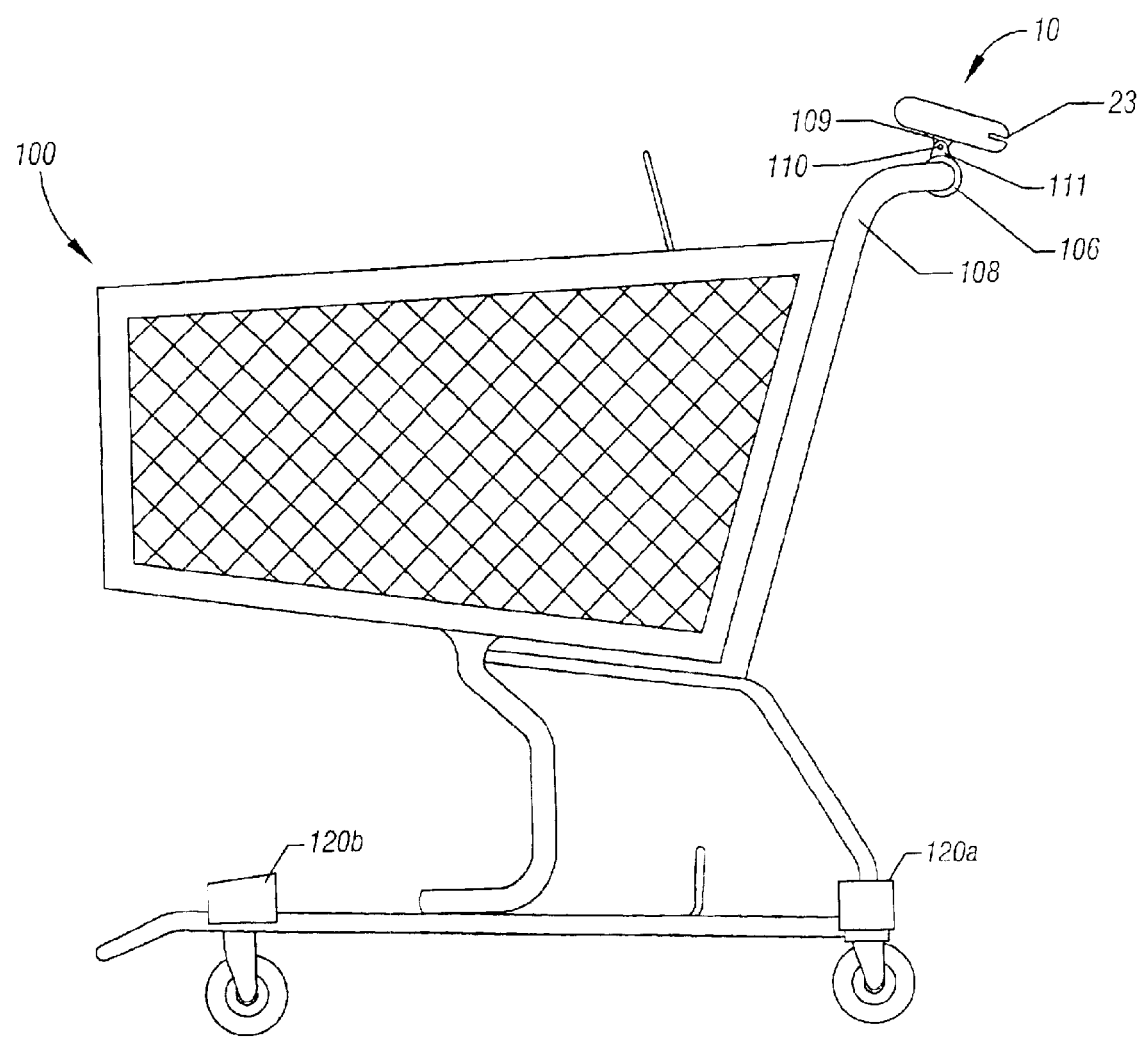
FIG. 7 is a side elevational view of a shopping cart according to one embodiment of the present invention.

Referring to FIG. 7, the PDA 10 may be adjustably connected to a shopping cart 100. The shopping cart 100 may be a conventional rolling shopping basket in one embodiment. The PDA 10 may include a bracket 109 that pivotally connects to a flange 111 on a bracket 106 which attaches to the handle 108 of the shopping cart 100. Thus, the PDA 10 may be removably attached to existing shopping carts 100. Moreover, the angular orientation of the PDA 10 may be adjusted through the pivoting joint 110. In one embodiment, the joint 110 enables the orientation of the PDA 10 to be varied by the user.

The user can push the cart 100 by grasping the handle 108 on either side of the PDA 10. Thus, the user can operate the PDA 10 while pushing the shopping cart 100 in some embodiments.

Figure 8:
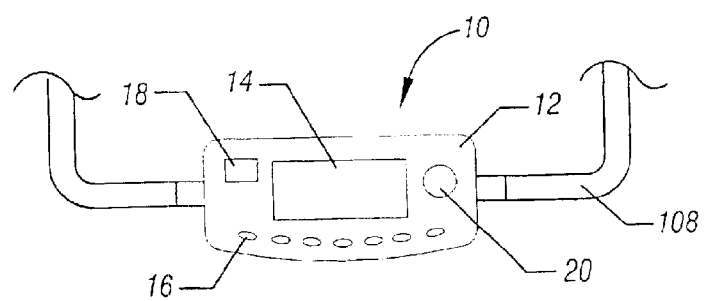
FIG. 8 is a top plan view of a portion of the cart shown in FIG. 7 in one embodiment of the present invention.

Referring again to FIG. 8, the cart 100 may include a plurality of position detecting devices 120. In one embodiment, the devices 120a and b may be oriented at opposite corners of the cart 100. Each device 120 may interact with tags that are positioned around a retail facility to enable the position of the cart 100 to be determined. For example, in one embodiment, the devices 120 emit signals such as radio frequency signals that may be detected by radio frequency tags situated around the retail facility. Each tag may include an appropriate number so that when the processor-based system 10 receives the number via the devices 120, the position of the cart 100 may be determined. Thus, in one embodiment, the devices 120 are coupled to the PDA 10.

Figure 9:
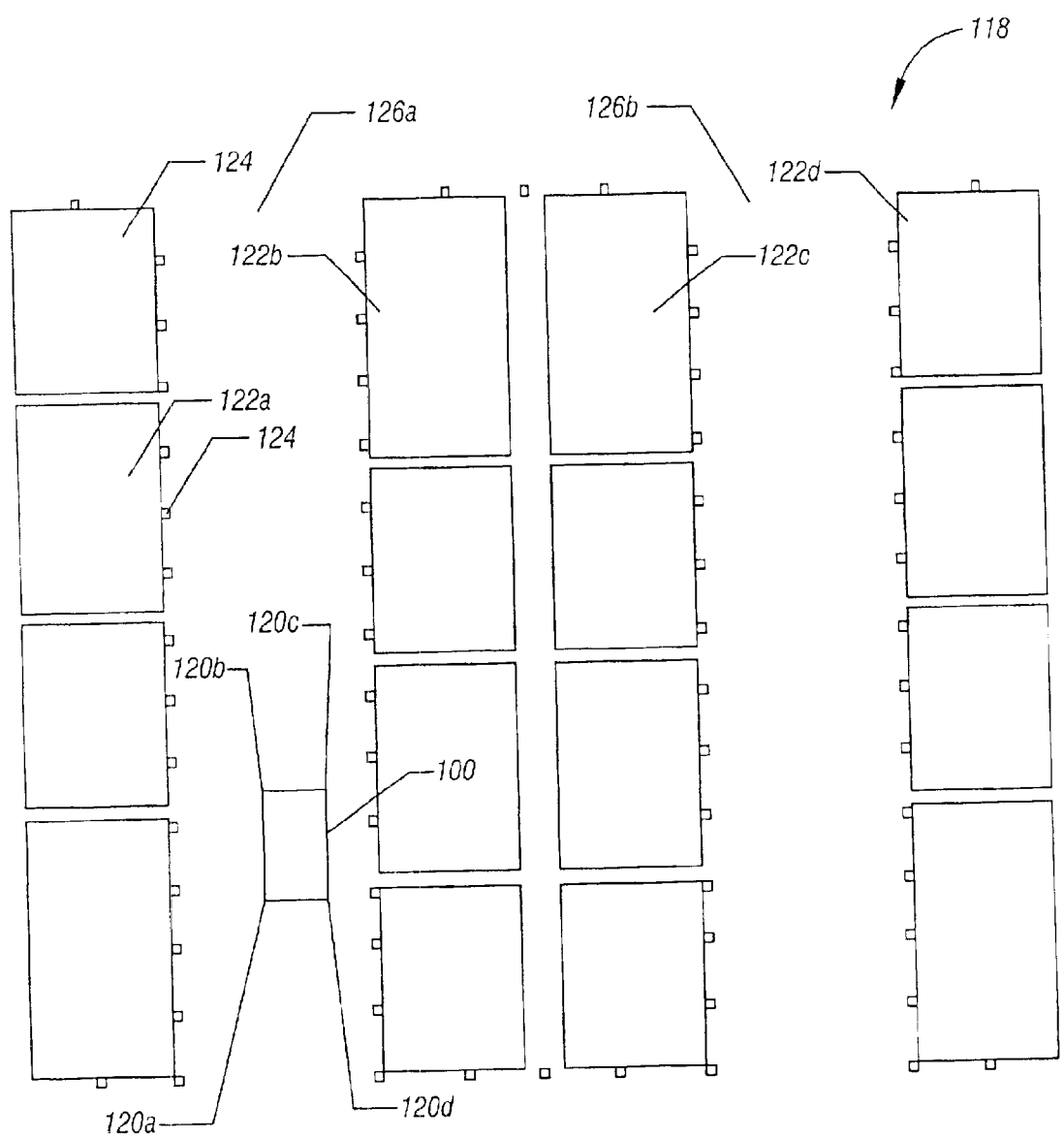
FIG. 9 is a top plan view of a facility in accordance with one embodiment of the present invention.

Referring next to FIG. 9, a retail facility 118 may include a plurality of racks 124 storing merchandise. A plurality of racks form a plurality of rows 122 such as the row 122a on the left in FIG. 9.

Each of the racks 124 may have periodically spaced identifier tags 124. The tags 124 may be radio frequency receivers which, when they receive a signal from one of the devices 120, replies with a number. The number of each tag 124 is different, in one embodiment, and therefore the PDA 10 may send the information it receives from a tag 124 to a server 34. Although the tag 124 identifier may be an arbitrary member or code, the value of each identifier may be stored in a database in association with a physical coordinate in the facility 118. The server 34 then may determine the location of the cart 100. Alternatively, the PDA 10 may determine the location of the cart 100 from the same information.

In one embodiment, the cart 100 includes devices 120 a through d at each of its corners. Thus, different devices 120 may communicate with different tags 124. This may enable very precise positioning of the location of a cart 100 in an aisle 126a or 126b for example. The location of the cart 100 may be shown on the display 14, for example by indicating the position of the cart 100 on a plan view or map of the facility 118.

Figure 10:
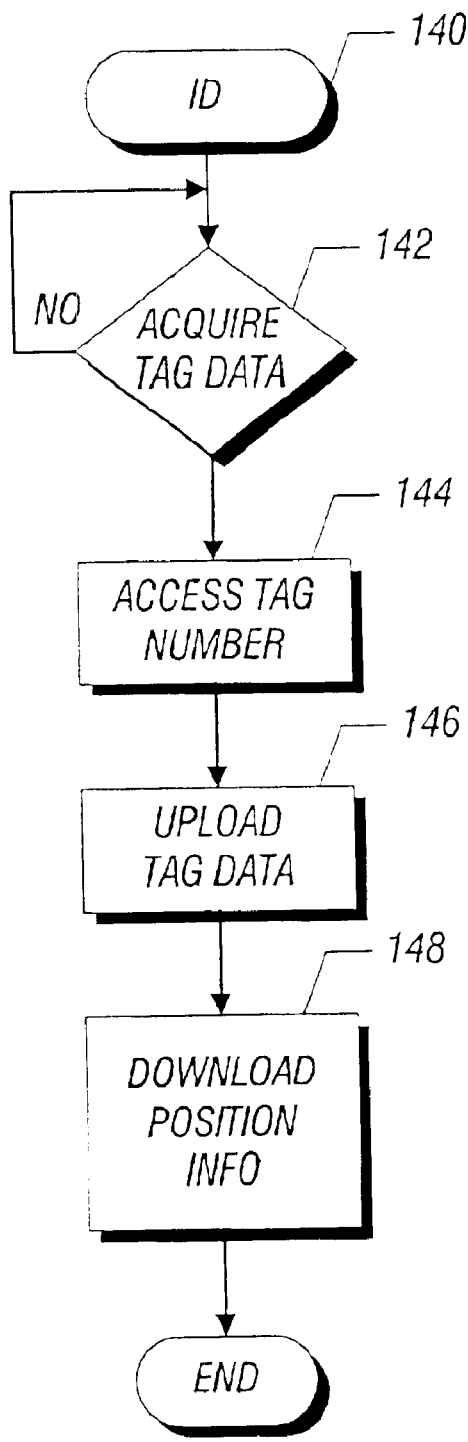
FIG. 10 is a flow chart for software useful in accordance with one embodiment of the present invention.

Referring to FIG. 10, in accordance with one embodiment, the ID software 140 may be stored in a storage associated with the PDA 10. Initially, a check at diamond 142 determines whether any of the devices 120 have acquired tag 124 data. If so, the tag number for each particular tag 124 acquired by a device 120 may be accessed as indicated in block 144. The tag data may then be uploaded to the server 34 as indicated in block 146. In one embodiment, the server 34 may then provide position information back to the PDA 10, as indicated in block 148.

While an embodiment has been described in which the tags 124 are radio frequency tags, other sensors and detector pairs may be utilized, as well. For example, in one embodiment inductive and/or capacitive tags may be utilized.

In some embodiments, by storing the tag 124 information previously detected, the direction of travel of the cart 100 may be determined. In some embodiments, the movement of a cart 100 over time may be stored on the server 34.

In some embodiments, once the position of the cart 100 is known, the user can request routing information from the server 34 to indicate how to transition from one location associated with a first series of tags 124, to another location associated with a different series of tags 124. The display 14 associated with the PDA 10 may display the user's current position based on the information received from the server 34 in one embodiment.

While an embodiment has been described involving a retail facility 118, other embodiments may involve enterprise installations, office buildings, and residential environments as additional examples.

In some embodiments, the identifying data for a particular tag 124 may be directly related to a product. For example, the tag 124 may be the actual bar code for a product. Thus, detected proximity to the product can be used as effective marketing data. For example, information about the time spent at a particular product location may be utilized for marketing purposes. In addition, the user's current location may be used as a trigger event to provide promotional data to the user's PDA 10. For example, the PDA 10 may show a commercial about a product that the shopper is close to or has spent some time looking at.

In other embodiments, information about the last item selected and placed in the shopping cart 100 may be utilized to provide commercials, suggestions, recipes and directions to related products located elsewhere in the facility 118.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
  receiving information from a plurality of wireless tags around a retail facility;
  analyzing information from said tags to determine the current location of a shopping cart;
  wirelessly linking a plurality of shopping carts within a retail facility through a local area network based in the retail facility; and
  enabling the carts to communicate with one another through said network.

2. The method of claim 1 including providing a processor-based device on a shopping cart to retail customers that wirelessly communicates with a server.

3. The method of claim 1 including pushing information to the cart depending on the carts current location.

4. The method of claim 1 including providing a plurality of sensors associated with the user, each sensor to sense the tags to determine the position of the user in the facility.

5. The method of claim 1 including providing a sensor to sense the tags on a shopping cart.

6. The method of claim 1 including receiving identifying information from each of a plurality of wireless tags.

7. The method of claim 6 including providing said information from said wireless tags to a server.

8. The method of claim 6 including using said information from said wireless tags to determine the current location of the user.

9. The method of claim 1 including providing a route from the user's current position to a requested destination within said facility.

10. An article comprising a medium storing instructions that, if executed, enable a processor-based system to:
  receive information from a plurality of wireless tags distributed about a retail facility;
  analyze information from the tags to determine the current location of a user;
  wirelessly link a plurality of shopping carts within the retail facility through a local area network based in the retail facility; and
  enable the carts to exchange information among the carts through said network.

11. The article of claim 10 further storing instructions that enable the processor-based system to provide information about the current location of a processor-based device associated with a cart.

12. The article of claim 11 further storing instructions that enable the processor-based system to determine the carts location.

13. The article of claim 12 further storing instructions that enable the processor-based system to push information to a cart depending on the cart's current location.

14. The article of claim 10 further storing instructions that enable the processor-based system to receive information from a plurality of sensors associated with the user, and extract position information from a plurality of tags sensed by each of the plurality of sensors to determine the position of the user.

15. The article of claim 10 further storing instructions that enable the processor-based system to receive identifying information from each of a plurality of wireless tags.

16. The article of claim 15 further storing instructions that enable the processor-based system to provide said information from said wireless tags to a server.

17. The article of claim 15 further storing instructions that enable the processor-based system to use the information from the wireless tags to determine the current location of the user.

18. The article of claim 10 storing instructions that enable the processor based system to provide information about the route traveled from the user's current location to a requested destination.

19. A system comprising:
  a processor; and
  a storage coupled to said processor recevie information from a plurality of wireless tags distrubuted about a retail facility, analyze information from the tagsto determine the current location of a shopping cart, wirelessly link a plurality of shopping carts within the retail facility through a local area network based in the retail facility, and enable the carts to exchange information among the carts through said network.

20. The system of claim 19 further including a wireless transceiver.

21. The system of claim 19 further including an interface to enable network communications.

22. The system of claim 19, said system including a plurality of wireless tags, wherein each of said wireless tags provides an identifying code to said wireless sensor.

23. The system of claim 19 including a plurality of wireless sensors associated with the user.

24. The system of claim 19 including a shopping cart, said wireless sensor and said processor mounted on said shopping cart.

25. The system of claim 19 including a wireless interface to communicate with a network.

26. The system of claim 25 wherein said processor forwards information from said tags through said wireless interface to said network.

27. The system of claim 19 including a server coupled to said network, said server to receive position identifying information from a sensor and provide advertising information to said processor.

* * * * *

UNITED STATES PATENT AND TRADEMARK OFFICE
CERTIFICATE OF CORRECTION

PATENT NO. : 7,084,765 B2
APPLICATION NO. : 09/904236
DATED : August 1, 2006
INVENTOR(S) : Edward O. Clapper Page 1 of 1

It is certified that error appears in the above-identified patent and that said Letters Patent is hereby corrected as shown below:

Column 7:
Line 17, "carts" should be --cart's--.

Column 8:
Line 24, "recevie" should be --receive--;
Line 25, 'distrubuted" should be --distributed--.

Signed and Sealed this

Twenty-eighth Day of November, 2006

JON W. DUDAS
*Director of the United States Patent and Trademark Office*